April 8, 1930.     L. L. WHITNEY     1,753,455
BRAKE LEVER CONNECTER BODY
Filed Jan. 5, 1925     2 Sheets-Sheet 1
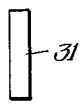
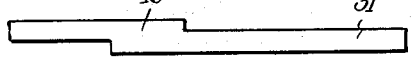
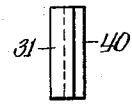
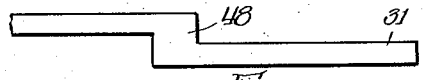
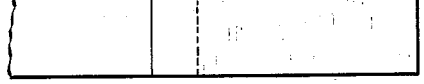
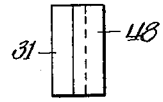
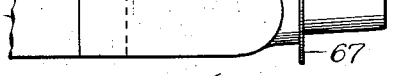
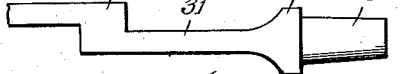
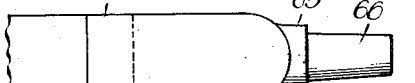
Inventor:
Loren L. Whitney April 8, 1930. L. L. WHITNEY 1,753,455
BRAKE LEVER CONNECTER BODY
Filed Jan. 5, 1925 2 Sheets-Sheet 2
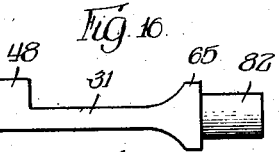
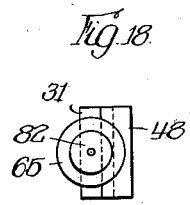
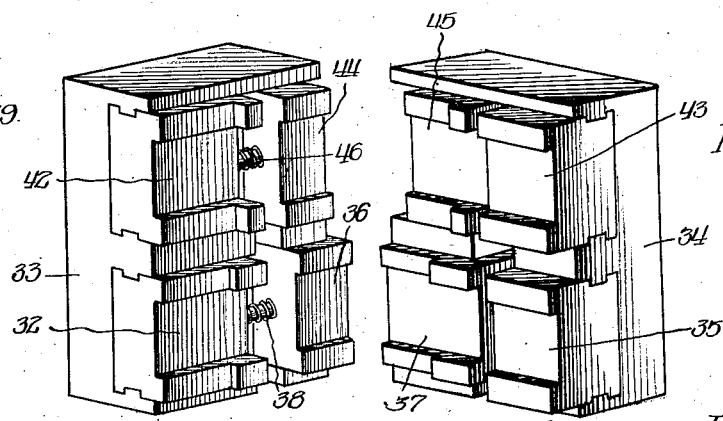
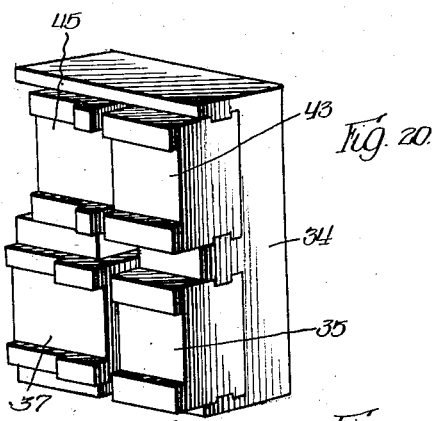
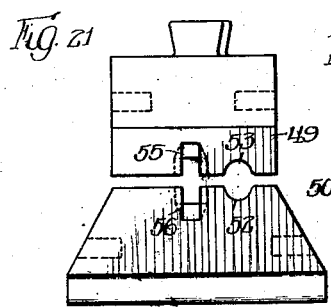
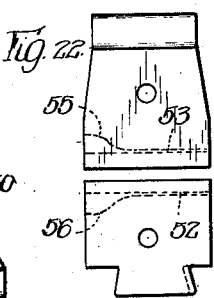
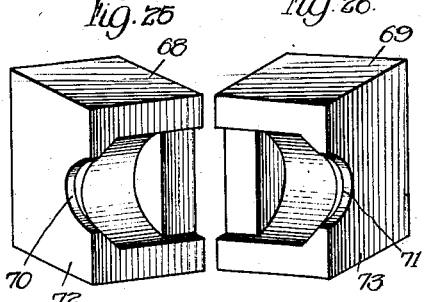
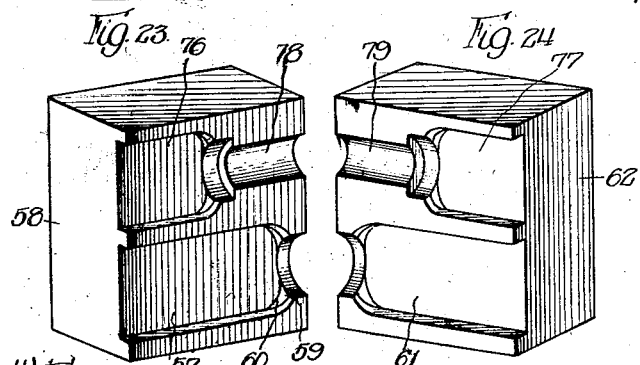
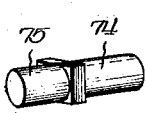
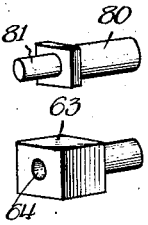
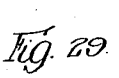
Inventor
Loren L. Whitney,
By Wilkinson Huxley Byron + Knight
attys
Witness:
R. Burkhardt Patented Apr. 8, 1930

1,753,455

UNITED STATES PATENT OFFICE

LOREN L. WHITNEY, OF HAMMOND, INDIANA, ASSIGNOR TO AMERICAN STEEL FOUNDRIES, OF CHICAGO, ILLINOIS, A CORPORATION OF ILLINOIS

BRAKE-LEVER CONNECTER BODY

Application filed January 5, 1925. Serial No. 672.

This invention relates to a new and improved method of forming brake lever connecter bodies or the like and more particularly, to a combination of forging and hammering operations adapted to form such a body from flat blanks.

A brake lever connecter body comprises a flat main portion offset at an intermediate point and a rounded trunnion formed upon one end thereof.

It is an object of the present invention to provide new and improved methods for forming bodies of this type by a simple series of forging and hammering operations which may be rapidly and efficiently carried out for quantity production.

Other and further objects will appear as the description proceeds.

I have shown the blank at different stages during the process and suitable dies for carrying out the method, in the accompanying drawings, in which—

Figures 1 to 18 show the blank as it appears in the various steps of the method, and Figures 19 to 29 show dies and plungers adapted for carrying out my method.

The blank used may be a flat bar 31 as shown in side elevation in Figure 1 and in end elevation in Figure 2. This bar is placed against the portion 32 of the fixed die 33 shown in Figure 19. The movable die 34 shown in Figure 20 is brought against the fixed die 33 and the blank is gripped between the portion 32 of the fixed die and the portion 35 of the movable die. The blank extends also between the portions 36 and 37 of the fixed and movable dies respectively, and is bent laterally as the dies are brought together. Force is then applied to the longitudinally movable portions 36 and 37 of the dies, which are caused to move towards the portions 32 and 35, the springs 38 and 39 being compressed. This forms the blank with the offset and thickened portion 40, as shown in Figures 3 to 5, which are a top view, a side elevation and an end elevation, respectively.

The blank is next placed against the portion 42 of the die 33 shown in Figure 19 and the portion 43 of the die 34 is brought laterally against it. The portions 44 and 45 of the two dies are thrust in longitudinally against the springs 46 and 47 and the offset portion 40 is further thickened and brought to the form shown at 48 in Figures 6 to 8. These Figures 6 to 8, are a top view, a side view and an end view of the blank at this stage of its manufacture.

The blank next has one end hammered between the hammer dies 49 and 50 shown in Figures 21 and 22. The end portion 51 is rounded by means of the portions 52 and 53 of the dies and the rounded shoulder 54 is formed by the portions 55 and 56 of the dies. The blank has now assumed the form shown in side elevation in Figure 9 and in end elevation in Figure 10.

The partly formed blank is next placed in the recess 57 of the die 58 shown in Figure 23. The portion 51 of the blank extends through the portion 59 of the die and the shoulder 54 is brought against the portion 60 of the die. The portion 61 of the movable die 62 shown in Figure 24 is next brought laterally against the fixed die 58 and clamps the blank between the die. The plunger 63 is then brought longitudinally against the end 51 of the blank, this portion 51 being received in the opening 64 of the plunger 63. This movement brings the blank to the form shown in side elevation in Figure 11 and in end elevation in Figure 12. The rounded shoulder 65 has been formed by the portion 59 of die 58 and a similar cooperating portion of the die 62. The trunnion 66 has been shortened and thickened by the opening 64 of the plunger 63. The excess of metal has formed the flash 67.

The next operation, that of removing the flash, is accomplished by the dies 68 and 69 shown in Figures 25 and 26. The blank is gripped between these dies, the shoulder 65 fitting between the rounded surfaces 70 and 71 and the flash abutting against the faces 72 and 73. The plunger 74, shown in Figure 27, has its portion 75 thrust against the trunnion 66 which forces the blank inwardly between the dies and shears off the flash 67. The blank has now assumed the form shown in Figures 13 to 15 in top view, side elevation and end elevation, respectively.

In the final forming operation, the blank is placed between the portions 76 and 77 of the dies 58 and 62 shown in Figures 23 and 24, the trunnion 66 fitting between the portions 78 and 79. The plunger 80 shown in Figure 28 now has its portion 81 thrust longitudinally into the opening formed by recesses 78 and 79 and against the end of the trunnion 66 which is brought to its final form as shown at 82 in Figures 16, 17 and 18. These figures show the completed brake lever connecter body. It will be understood that the blank will have been heated, as necessary for properly carrying out these operations.

While I have shown one particular set of forging and hammering dies, which are adapted for carrying out my method, it will be understood that these are illustrative only, as it may be carried out by other forms of dies. I contemplate such changes and modifications as come within the spirit and scope of the accompanying claims.

I claim:

1. The method of forming brake lever connecter bodies or the like, which comprise hammering the end of a flat blank to form an elongated cylindrical portion joined to the body of the blank, compressing the blank longitudinally to shorten said cylindrical portion and enlarging the base thereof and forming a shoulder thereon in a manner to convert said cylindrical portion into a truncated cone and then further shortening said truncated cone and enlarging its outer portion to produce a shortened and enlarged cylindrical finished end.

2. The method of forming brake lever connecter bodies or the like, which comprise hammering the end of a flat blank to form an elongated cylindrical portion joined to the body of the blank, compressing the blank longitudinally to shorten said cylindrical portion and enlarging the base thereof and forming a shoulder thereon in a manner to convert said cylindrical portion into a truncated cone, removing the flash and then further shortening said truncated cone and enlarging its outer portion to produce a shortened and enlarged cylindrical finished end.

3. The method of forming brake lever connecter bodies or the like, which consists in double bending a flat blank to offset portions thereof a relatively slight amount, then causing said offset portions to approach each other through movement in parallel paths, while confining and moulding the upset metal between the bends, and subsequently, double bending the piece so formed to offset said portions a greater amount and then again causing said portions to approach each other through movement in parallel paths, while confining and forming the metal at the location of the first offset to form a greater offset.

4. The method of forming brake lever connecter bodies or the like, which consists in double bending a flat blank to offset portions thereof a relatively slight amount, then causing said offset portions to approach each other through movement in parallel paths, while confining and moulding the upset metal between the bends, and subsequently, double bending the piece so formed to offset said portions a greater amount and then again causing said portions to approach each other through movement in parallel paths, while confining and forming the metal at the location of the first offset to form a greater offset and then forming a shouldered cylindrical end portion thereon.

Signed at Hammond, Indiana, this 29th day of Dec., 1924.

LOREN L. WHITNEY.